(12) United States Patent
Aoki et al.

(10) Patent No.: US 6,492,015 B1
(45) Date of Patent: Dec. 10, 2002

(54) COMPOSITE SHEET HAVING FOAMED POLYCARBONATE RESIN LAYER AND NON-FOAMED POLYCARBONATE RESIN LAYER

(75) Inventors: Takeshi Aoki, Imaichi (JP); Yoshihisa Ishihara, Tochigi-ken (JP); Satoshi Iwasaki, Utsunomiya (JP); Seiji Takahashi, Utsunomiya (JP); Yoshiaki Momose, Utsunomiya (JP)

(73) Assignee: JSP Corporation (JP)

( * ) Notice: Subject to any disclaimer, the term of this patent is extended or adjusted under 35 U.S.C. 154(b) by 73 days.

(21) Appl. No.: 09/671,749

(22) Filed: Sep. 28, 2000

(30) Foreign Application Priority Data

Oct. 6, 1999 (JP) ............................................ 11-285356

(51) Int. Cl.$^7$ ................................................. B32B 3/00
(52) U.S. Cl. .............................. 428/318.8; 428/318.4; 428/318.6
(58) Field of Search ........................... 428/318.4, 318.6, 428/318.8

(56) References Cited

FOREIGN PATENT DOCUMENTS

| EP | 595187 A1 | | 5/1994 |
|---|---|---|---|
| JP | 06079816 | | 3/1994 |
| JP | 08174780 | | 7/1996 |
| JP | 08-174780 | * | 7/1996 |
| JP | 8183054 | | 7/1996 |
| JP | 08-183054 | * | 7/1996 |
| JP | 11-198331 | * | 7/1999 |
| JP | 11-300866 | * | 11/1999 |
| JP | 11320799 | | 11/1999 |

* cited by examiner

*Primary Examiner*—Terrel Morris
*Assistant Examiner*—Leanna Roche
(74) *Attorney, Agent, or Firm*—Lorusso & Loud

(57) ABSTRACT

A composite sheet having a first, foamed polycarbonate resin layer and a second, non-foamed polycarbonate resin layer provided on at least one surface of the first layer and having a melt tension of at least 2.45 cN at 250° C.

9 Claims, No Drawings

COMPOSITE SHEET HAVING FOAMED POLYCARBONATE RESIN LAYER AND NON-FOAMED POLYCARBONATE RESIN LAYER

BACKGROUND OF THE INVENTION

This invention relates to a composite sheet having a foamed polycarbonate resin layer and a non-foamed polycarbonate resin layer.

A polycarbonate resin foam has excellent heat resistance, cold resistance and impact resistance and is expected to be utilized for various applications such as receptacles, packing materials and interior construction materials. To be suitable for such applications, polycarbonate resin foam sheets are required to exhibit satisfactory workability and moldability; namely they should permit bending, punching, cutting, thermoforming and other processing.

In particular, since polycarbonate resin has a higher softening point as compared with ordinary resins such as polyolefin resins and polystyrene resins, much problems arise in molding polycarbonate resin foam sheets. For example, in order to smoothly conduct thermoforming, the temperature of the surface regions of the sheets must be raised. This causes breakage of cells in the surface regions, which in turn results in deterioration of appearance and mechanical properties.

JP-A-H08-174780 (Japanese Laid-Open publication) discloses a composite sheet having an improved moldability. The composite sheet has an extruded polycarbonate resin foam sheet and a polycarbonate skin film provided on at least one side of the foam sheet. The Japanese publication discloses preferability of the use of a polycarbonate skin film having a viscosity-average molecular weight of less than 20,000, since when the viscosity-average molecular weight is 20,000 or more, fluidity of the resin is so poor that extrusion of the resin results in non-uniformity in thickness of the composite sheet. The Japanese publication also discloses a composite sheet obtained by laminating a polycarbonate skin film having a viscosity average molecular weight of 30,000 onto a polycarbonate resin foamed sheet by heat bonding.

SUMMARY OF THE INVENTION

It has been found that the composite sheet of the above Japanese publication is not fully satisfactory because the mechanical strengths thereof, such as bending strength, are not high. Further, the known composite sheet has a problem because, when a roll of the sheet is unwound and flattened with heating, roughness are formed so that the appearance and surface smoothness of the flattened sheet become no good. It has also been found that a mere selection of a specific viscosity average molecular weight for a polycarbonate skin film to be laminated on a polycarbonate resin foamed sheet by heat bonding is insufficient to obtain a composite sheet having satisfactory workability and moldability.

The present invention provides a composite sheet comprising a first, foamed polycarbonate resin layer and a second, non-foamed polycarbonate resin layer provided on at least one surface of said first layer and having a melt tension of at least 2.45 cN at 250° C.

It is an object of the present invention to provide a composite sheet which has a foamed polycarbonate resin layer and a non-foamed polycarbonate resin layer and which has good moldability and processability.

Another object of the present invention is to provide a composite sheet of the above-mentioned type which can give a molded body having good surface appearance and good mechanical properties.

It is a further object of the present invention to provide a composite sheet of the above-mentioned type which can be bent without forming cracks or breakage.

It is a further object of the present invention to provide a composite sheet of the above-mentioned type which can be processed into flat boards without causing problems, such as formation of roughness, when a rolled sheet is unwound and flattened with heating.

Other objects, features and advantages of the present invention will become apparent from the detailed description of the preferred embodiments of the invention to follow.

DETAILED DESCRIPTION OF THE PREFERRED EMBODIMENTS OF THE INVENTION

A composite sheet according to the present invention comprises a first, foamed polycarbonate resin layer containing generally at least 50% by weight, preferably at least 80% by weight, more preferably at least 90% by weight, of a polycarbonate resin and a second, non-foamed polycarbonate resin layer provided on at least one surface of the first layer and containing generally at least 50% by weight, preferably at least 70% by weight, more preferably at least 90% by weight, of a polycarbonate resin.

The foamed polycarbonate resin layer may be generally prepared by an extrusion molding method which includes the following steps:

Step (a): A polycarbonate resin and, if desired, additives such as a cell nucleating agent, are heated, melted and kneaded in an extruder;

Step (b): The kneaded resin in the extruder is mixed with a blowing agent;

Step (c): The kneaded mixture is extruded through a circular die or a flat die provided at the tip of the extruder into an environment having a lower pressure than that in the extruder, so that the extrudate starts foaming.

Step (d1): The extrudate from the circular die is received around a cylindrical cooling device and is then cut along the longitudinal direction (extrusion direction) to obtain a foamed sheet;

Step (d2): The extrudate from the flat die is cooled by, for example, passing between cooling rolls to obtain a foamed sheet; and Step (e): If desired, the foamed sheet obtained in step (d1) or (d2) is passed through a heating zone and the soften sheet is drawn in the longitudinal (extrusion) direction or in both longitudinal and lateral directions.

The polycarbonate resin is a polyester of carbonic acid with a glycol or a bisphenol. An aromatic polycarbonate having diphenyl alkanes in its molecular chain is suitably used for the purpose of the present invention because of its good heat resistance, cool resistance, weatherability and acid resistance. Illustrative of suitable polycarbonate resins are aromatic polycarbonate resins obtained from a bisphenol, such as 2,2-bis(4-oxyphenyl)propane (bisphenol A), 2,2-bis (4-oxyphenyl)butane, 1,1-bis(4-oxyphenyl)cyclohexane, 1,1-bis(4-oxyphenyl)butane, 1,1-bis(4-oxyphenyl)isobutane and 1,1-bis(4-oxyphenyl)ethane. A mixture of two or more different polycarbonate resins may be used, if desired. The polycarbonate resin has a viscosity average molecular weight of preferably at least 25000, more preferably at least 28,000, most preferably at least 30,000, for reasons of satisfactory mechanical strengths. The upper limit of the viscosity average molecular weight is generally about 70,000.

The polycarbonate resin may be mixed with one or more other resins, rubbers, thermoplastic elastomers in an amount of less than 50% by weight of the polycarbonate foamed layer for the purpose of imparting various desired physical properties, such as resistance to alkali, still more resistance to heat, still more resistance to cool and resistance to hot water, to the foamed resin layer. Such other resins and elastomers may be, for example, polystyrene resins, polyethylene resins, polypropylene resins, polycaprolactone, methacrylic resins, polyethylene terephthalate, polybutylene terephthalate, acrylontrile-butadiene-styrene copolymers, methacrylic acid-butadiene-styrene copolymers, styrene-maleic acid copolymers, styrene-acrylic acid copolymers, styrene-acrylic acid ester-styrene block copolymers, styrene-butadiene-styrene block copolymers, styrene-isoprene-styrene block copolymers, styrene-ethylene-butylene-styrene block copolymers and styrene-ethylene-propylene-styrene block copolymers. A compatibility improving agent may be used, if necessary, when a resin used is not compatible with the polycarbonate resin.

As the blowing agent, there may be used an inorganic blowing agent, a volatile blowing agent or a decomposition-type blowing agent. For reasons of attaining a higher expansion ratio by extrusion foaming, it is preferable to use a volatile organic blowing agent such as a lower aliphatic hydrocarbon, a lower alicyclic hydrocarbon, an aliphatic alcohol or a halogenated hydrocarbon. Illustrative of inorganic blowing agents are carbon dioxide gas, nitrogen gas and air. Illustrative of aliphatic hydrocarbons are propane, n-butane, i-butane, n-pentane, i-pentane and hexane. Illustrative of alicyclic hydrocarbons are cyclobutane, cyclopentane and cyclohexane. Illustrative of aliphatic alcohols are methanol, ethanol and propanol. Illustrative of halogenated hydrocarbons are 1-chloro-1,1-difluoroethane, pentafluoroethane, 1,1,1,2-tetrafluoroethane and 1,1-difluoroethane. The above blowing agents may be used singly or in combination of two or more thereof. It is also possible to use different types of blowing agents, such as together. A decomposition-type blowing agent may be also used in conjunction with an inorganic blowing agent and/or a volatile blowing agent, for the purpose of adjusting the cell size of the foamed layer.

The amount of the blowing agent varies with the kind thereof and intended expansion ratio. In the latter case, since the density of the foamed body depends upon the expansion ratio, the amount of the blowing agent is determined by the desired density of the foamed body. For reasons of suitable mechanical strengths, heat insulating properties and weight, the foamed polycarbonate layer generally has a density of 0.03–0.6 g/cm$^3$, preferably 0.06–0.24 g/cm$^3$. Thus, the blowing agent may be used in an amount providing such a density. For example, a volatile blowing agent such as butane is used in an amount of 0.5–10 parts by weight per 100 parts by weight of the resin so that the foamed body has a preferred density of 0.06–0.24 g/cm$^3$. An inorganic blowing agent such as carbon dioxide is used in an amount of 0.2–3 parts by weight per 100 parts by weight of the resin so that the foamed body has a preferred density of 0.06–0.24 g/cm$^3$.

A cell nucleating agent in the form of fine powder, such as an inorganic substance (e.g. silica or talc), an acidic salt of a polyhydric carboxylic acid or a mixture of a polyhydric carboxylic acid with sodium carbonate or sodium bicarbonate, may be suitably incorporated in the melt containing the resin and blowing agent. The fine particles of the nucleating agent serve as nuclei of cells to facilitate the formation of fine cells. The nucleating agent is generally used in an amount of 0.01–5 parts by weight, preferably 0.05–0.5 part by weight, per 100 parts by weight of the resin.

The foamed polycarbonate resin layer generally has a thickness of 0.5–15 mm. In the case of a flexible composite sheet like a thermofoaming sheet, the foamed layer preferably has a thickness of 0.7–5 mm. In the case of a non-flexible composite sheet like a board, the foamed layer preferably has a thickness of 2–10 mm.

The non-foamed polycarbonate layer laminated on at least one side of the foamed polycarbonate layer is made of a polycarbonate resin and, if desired, one or more other resins or elastomers. The polycarbonate resin and optionally used other resins or elastomers may be those described above with reference to the foamed polycarbonate layer. It is important that the non-foamed polycarbonate layer should have a melt tension at 250° C. of at least 2.45 cN, preferably at least 6.37 cN, more preferably at least 7.84 cN. The upper limit of the melt tension is generally 30 cN.

When the melt tension of the non-foamed polycarbonate layer is less than 2.45, appearance and moldability in thermoforming of the resulting composite sheet is unsatisfactory. A melt tension of the non-foamed layer of at least 6.37 cN is particularly preferred because the resulting composite sheet exhibits excellent bendability, excellent appearance and permits thermoforming at a high temperature without causing breakage of cells even when the sheet is thick.

It is preferred that the polycarbonate resin contained in the non-foamed polycarbonate layer have a viscosity average molecular weight of 20,000–70,000, more preferably 23,000–50,000, most preferably 28,000–40,000.

It is also preferred that the polycarbonate resin contained in the non-foamed polycarbonate layer have a melt tension at 250° C. of at least 2.45 cN, preferably at least 6.37 cN, more preferably at least 7.84 cN, with the upper limit of the melt tension being generally 30 cN. A polycarbonate resin having such a melt tension range can be obtained by increasing the molecular weight thereof and/or by introducing branched chains in the molecular chain thereof. Control of the structure, length, number of the branched chains is also effective in obtaining a polycarbonate resin having a desired melt tension. Examples of polycarbonate resins particularly suitable for forming the non-foamed polycarbonate resin layer include "IUPILON E1000" (manufactured by Mitsubishi Engineering Plastics; Viscosity average molecular weight: 32,000; Melt tension: 6.27 cN at 2500° C.), "IUPILON E2000" manufactured by Mitsubishi Engineering Plastics; Viscosity average molecular weight: 29,000; Melt tension: 2.55 cN at 250° C.) and "IB2500" (manufactured by Idemitsu Petrochemical Co., Ltd.; Viscosity average molecular weight: 29,000; Melt tension: 14.21 cN at 250° C.).

In the present specification, the melt tension is measured using a Melt Tension Tester II Model manufactured by Toyo Seiki Seisakusho, Ltd. having a construction as specified in ASTM D 1238. The tester has a cylinder provided with a heater for maintaining a resin sample in a molten state at a predetermined temperature of 250° C. The cylinder is also provided with a vertically downwardly oriented orifice having an inside diameter of 2.095 mm and a length of 8 mm at the bottom thereof. The cylinder has a piston operable at a speed of 10 mm/min to extrude the melt downward through the orifice to an atmosphere maintained at 23° C. The extrudate in the form of a string or filament solidifies as it moves downward. The extrudate is passed through a tension-detecting pulley (diameter: 45 mm, distance between the orifice and center of the pulley: 250 mm), guided by guide rollers to make a 180 degree wrap angle around the pulley and then wound up around a take-up roller at a constant speed of 10 m/min. The tension at this time is detected by means of a load cell connected to the pulley and recorded by means of a recorder to determine an amplitude of variation of melt tension. The melt tension is a median value of the amplitude at a stable amplitude portion. Extraordinary variations sometimes occurring in the recorded amplitude are ignored.

The viscosity average molecular weight is determined from a limiting viscosity according to the Schnell's formula:

$$[\eta]=1.23\times10^{-4}\times M^{0.83}$$

wherein [η] represents the limiting viscosity and M represents the viscosity average molecular weight. The limiting viscosity [η] is determined as follows. A sample is dissolved in methylene chloride at 20° C. to obtain solutions having varying concentrations C (g/100 cm³) Specific viscosity $\eta_{sp}$ of each solution is measured using Ostwald viscometer. When the sample contains an insoluble matter as in a case of a mixture of a polycarbonate resin with a polyethylene resin, the insoluble matter is removed by filtration and the filtrate is measured for the specific viscosity. $\eta_{sp}$/C is then plotted against C. From the graph the limiting viscosity [η] is determined as follows.

$$[\eta]=\lim \eta_{sp}/C$$

C→0

The non-foamed polycarbonate resin layer may be in the form of a non-stretched film or a monoaxially or biaxially stretched film. For reasons of moldability, the use of a monoaxially or biaxially stretched film is preferred. The lamination of the non-foamed polycarbonate resin layer on the foamed polycarbonate resin layer may be carried out by coextrusion of a melt of a foamable polycarbonate resin and a melt of a non-foamable polycarbonate resin, by extrusion of a melt of a non-foamable polycarbonate resin over a previously prepared foamed polycarbonate resin sheet, by heat bonding of a non-foamed polycarbonate resin film with a foamed polycarbonate resin sheet, or by bonding of a non-foamed polycarbonate resin film and a foamed polycarbonate resin sheet with an adhesive.

The non-foamed polycarbonate resin layer generally has a thickness of 10–1500 μm. In the case of a flexible composite sheet, the non-foamed layer preferably has a thickness of 20–200 μm. In the case of a non-flexible composite sheet, the non-foamed layer preferably has a thickness of 50–500 μm.

It is preferred that the composite sheet be prepared by coextrusion of non-foamable and foamable layers or by extrusion of a non-foamable layer on a foamed sheet. In these cases, the thickness of the non-foamed resin layer is preferably 20–500 μm, more preferably 50–200 μm for reasons of freedom of pin holes, satisfactory flexibility and uniformity of thickness. A total thickness of the composite sheet obtained using extrusion technique is preferably 0.5–15 mm for reasons of satisfactory mechanical strengths and moldability.

The composite sheet according to the present invention generally shows thermal shrinkage of at least 6% in both longitudinal direction (process direction or extrusion direction) and lateral direction, preferably at least 8% in both directions, most preferably at least 8% in one of the longitudinal and lateral directions and at least 10% in the other direction, for reasons of satisfactory surface smoothness, processability and appearance.

In the foamed layer or layers and/or non-foamed layer of the composite sheet, one or more additives, such as a filler, a flame retardant, a heat stabilizer, a weatherability improving agent and a coloring agent, may be incorporated, if desired. Illustrative of suitable inorganic fillers are hydroxides such as aluminum hydroxide, calcium hydroxide and magnesium hydroxide; carbonates such as calcium carbonate, magnesium carbonate and barium carbonate; sulfites such as calcium sulfite and magnesium sulfite; sulfates such as calcium sulfate, magnesium sulfate and aluminum sulfate; oxides such as calxium oxide, aluminum oxide and silicon oxide; and clay or minerals such as talc, clay, montmorillonite, kaolin and zeolite. Such an inorganic filler may be used in an amount of 5–30% by weight of the resin layer. The non-foamed polycarbonate layer may be in the form of a nanocomposite of the polycarbonate resin and the above inorganic filler.

The composite sheet according to the present invention has good appearance, mechanical strengths, moldability and processability such as in thermoforming, bending, cutting, punching and folding works.

In particular, the composite sheet has advantageous properties such as light-weight, rigidity, heat resistance, cool resistance, toughness and shock resistance and is suited as raw materials for the production of heat-resisting receptacles, low temperature shock absorbers, cone loudspeakers, panels as substitute for plywood.

The following examples will further illustrate the present invention.

In the present specification, melt viscosity is determined as follows:

As a melt viscosity measuring device, RHEOVIS2100 manufactured by CEAST Corporation is used. A melt of a sample resin is extruded through an orifice (orifice inside diameter: 1.0 mm; orifice length: 10 mm) mounted on a tip of the device at a resin temperature of 250° C. and at a rate of shear of 100 sec$^{-1}$ to measure the melt viscosity.

In the following examples, shrinkage, surface appearance and bendability are determined by the following methods.

Shrinkage:

From a longitudinally extruded composite sheet, 10 square samples, each having a length along the longitudinal direction of 100 mm and a length along the lateral direction of 100 mm, are cut out as follows. Five samples are obtained along a longitudinal centerline of the composite sheet, such that the centerline of each sample coincides with the centerline of the composite sheet. Another five samples are obtained along an arbitrarily selected lateral line perpendicular to the longitudinal centerline. Thus, a part of the composite sheet including the lateral line is longitudinally divided into five sections having the same width. From each section, one sample is obtained along a centerline of the divided sheet, such that the centerline of the sample coincides with the centerline of the divided composite sheet.

The thus obtained 10 samples are subjected to shrinkage test. Each sample is heated for 60 seconds in an oven maintained at 180° C. and then allowed to stand at 25° C. for 60 minutes. The shrinkage of each sample is calculated according to the formula shown below and an average of the measured values for the 10 samples represents the shrinkage of the composite sheet.

$$RL=[(BL-AL)/BL]\times 100\ (\%)$$

RL: Shrinkage of the sample sheet in the longitudinal direction

AL: Length of the longitudinal centerline of the sample after the heat treatment BL: Length of the centerline before the heat treatment (i.e. 100 mm)

$$RW=[(BW-AW)/BW]\times 100\ (\%)$$

RW: Shrinkage of the sample sheet in the lateral direction

AW: Length of the lateral centerline of the sample after the heat treatment

BW: Length of the centerline before the heat treatment (i.e. 100 mm)

Appearance:

Appearance of composite sheets is observed with naked eyes and evaluated according to the following ratings:

A: surface is smooth

B: surface is rugged and/or wrinkled

Moldability:

A composite sheet is vacuum molded with heating in a mold into a cone loudspeaker having diameters of 200 mm and 50 mm at both ends and a length (depth) of 45 mm. The thermoforming is carried out with a molding machine (Type EF-36 manufactured by Sanwa Kogyo Co., Ltd.) having an upper heater section of 200 V×12 KW (40 heaters of 300 W) with an output 40% and a lower heater section of 200 V×4.8 KW (6 heaters of 800 W) with an output 60%. The above heating system has a low heater output for the purpose of homogeneously heating the composite sheet throughout its thickness. The heating time is a minimum time sufficient for completing the molding. Surface appearance of the thus obtained molding is observed with naked eyes and evaluated according to the following ratings:

A: no changes

B: slight surface roughness

C: significant roughness and breakage of cells

Bendability:

From a longitudinally extruded composite sheet, 10 square samples, each having a length along the longitudinal direction of 100 mm and a length along the lateral direction of 100 mm, are cut out in the same manner as that in the above shrinkage test. The 10 samples are grouped into halves. Each sample of one group is longitudinally folded along the longitudinal centerline, while each sample of the other group is laterally folded along the lateral centerline. The ridge of the folded sample is observed with naked eyes for the evaluation of bendability according to the following ratings:

A: No cracks are formed in any of the 10 samples when the folding operation is repeated thrice B: Slight cracks are formed in 1–3 samples when the folding operation is repeated twice or thrice C: Cracks are formed in 5 or more samples when the folding operation is performed once.

EXAMPLE 1

A polycarbonate resin A shown in Table 3 was blended with an amount of talc shown in Table 2 (percentage is based on the weight of the polycarbonate resin A) and the blend was heated, melted and kneaded in a first extruder. The kneaded blend was then mixed with an amount of a blowing agent shown in Table 2 (percentage is based on the weight of the polycarbonate resin A) to obtain a foamable melt. A second extruder was connected by means of a cross bar to a die of the first extruder. The second extruder was charged with a melt of a polycarbonate resin B shown in Table 3. The resins A and B were joined at the die into a laminar flow and extruded from an annular lip provided at the tip of the die to obtain an extrudate in the form of a tubular laminate having a core layer of the resin A interposed between inner and outer layers of the resin B having the same thickness. The core layer of the resin A foamed as soon as it was extruded from the die. The extrudate was received around a cylindrical cooling device, cooled and cut along the extruding (longitudinal) direction into a sheet.

The sheet was then heated at a temperature higher than the softening temperature of the polycarbonate resin A and drawn to obtain a stretched sheet having longitudinal and lateral lengths of 1.4 times and 1.2 times as long as the original length, respectively.

The resulting composite sheet was tested for its properties to give the results summarized in Tables 1 and 2.

EXAMPLES 2–4

Example 1 was repeated in the same manner as described except that the amount of talc, the kind and amount of the blowing agent, the kind of the polycarbonate resin B and/or the thickness of the surface layers of the resin B were changed as shown in Tables 1 through 3. The properties of the composite sheets are shown in Tables 1 and 2.

EXAMPLES 5–8 AND COMPARATIVE EXAMPLE

Example 1 was repeated in the same manner as described except that the amount of talc, the kind and amount of the blowing agent, the kind of the polycarbonate resin B and/or the thickness of the surface layers of the resin B were changed as shown in Tables 1 through 3 and that the stretching of the sheet was not carried out. The properties of the composite sheets are shown in Tables 1 and 2.

EXAMPLE 9

A polycarbonate resin A shown in Table 3 was blended with an amount of talc shown in Table 2 and the blend was heated, melted and kneaded in a first extruder. The kneaded blend was then mixed with an amount of a blowing agent shown in Table 2 and extruded from an annular lip provided at the tip of the die to obtain a tubular extrudate of the resin A. The resin A foamed as soon as it was extruded from the die. The extrudate was received around a cylindrical cooling device, cooled and cut along the extruding (longitudinal) direction into a sheet. On each of both sides of the thus obtained foamed sheet, the resin B shown in Table 3 was laminated by extrusion to obtain a composite sheet having a foamed layer of the resin A interposed between inner and outer layers of the resin B having the same thickness. The properties of the composite sheets are shown in Tables 1 and 2.

TABLE 1

| | Properties of Composite Sheet | | | | | |
|---|---|---|---|---|---|---|
| | Foamed Sheet | | Melt tension | Thickness of | Shrinkage (%) | |
| Example No. | Apparent Density (g/cm³) | Thickness (mm) | of Resin B (cN) | Surface Layers (μm) | Longi- tudinal | Lateral |
| 1 | 0.27 | 3.4 | 14.21 | 100 | 20 | 14 |
| 2 | 0.40 | 2.0 | 14.21 | 75 | 11 | 9 |
| 3 | 0.24 | 3.1 | 14.21 | 75 | 13 | 9 |
| 4 | 0.40 | 3.4 | 9.21 | 100 | 14 | 10 |
| 5 | 0.27 | 3.4 | 5.29 | 100 | 4.5 | 3.5 |
| 6 | 0.27 | 3.4 | 9.21 | 100 | 6 | 4 |
| 7 | 0.40 | 2.0 | 5.29 | 50 | 10 | 7 |
| 8 | 0.27 | 3.4 | 2.55 | 100 | 5 | 3 |
| Comp. | 0.40 | 2.0 | 1.76 | 50 | 2.5 | 1.5 |
| 9 | 0.40 | 2.2 | 14.21 | 100 | 12 | 7 |

TABLE 2

| Example No. | Lamination Method | Production Conditions Blowing Agent | Amount of Blowing Agent (wt %) | Amount of talc (wt %) | Properties of Composite Sheet Appearance | Moldability | Bendability |
|---|---|---|---|---|---|---|---|
| 1 | Coex. *1 | C5 *2 | 1.2 | 0.05 | A | A | A |
| 2 | Coex. *1 | C5 *2 | 0.8 | 0.03 | A | A | A |
| 3 | Coex. *1 | C4 *3 | 0.8 | 0.04 | A | A | A |
| 4 | Coex. *1 | C5 *2 | 0.8 | 0.02 | A | A | A |
| 5 | Coex. *1 | C5 *2 | 1.2 | 0.05 | A | B | B |
| 6 | Coex. *1 | C5 *2 | 1.2 | 0.05 | A | B | B |
| 7 | Coex. *1 | C5 *2 | 0.8 | 0.03 | A | B | B |
| 8 | Coex. *1 | C5 *2 | 1.2 | 0.05 | A | B | B |
| Comp. | Coex. *1 | C5 *2 | 0.8 | 0.03 | A | C | C |
| 9 | Lam. *4 | C4 *3 | 0.8 | 0.04 | A | A | A |

*1 Coex.: lamination by coextrusion of a melt of non-foamable polycarbonate resin and a melt of foamable polycarbonate resin
*2 C5: n-pentane
*3 C4: n-butane
*4 Lam.: lamination by extrusion of a melt of non-foamable polycarbonate resin on previously prepared foamed layer

TABLE 3

| Example No. | Polycarbonate A for Foamed Layer (weight ratio) | Polycarbonate B for Surface Layer (weight ratio) |
|---|---|---|
| 1 | IB2500/E2000 (5:5) | IB2500 |
| 2 | IB2500/E2000 (5:5) | IB2500 |
| 3 | IB2500/E2000 (5:5) | IB2500 |
| 4 | IB2500/E2000 (5:5) | IB2500/H3000 (7:3) |
| 5 | IB2500/E2000 (5:5) | IB2500/H3000 (5:5) |
| 6 | IB2500/E2000 (5:5) | IB2500/H3000 (7:3) |
| 7 | IB2500/E2000 (5:5) | IB2500/H3000 (5:5) |
| 8 | IB2500/E2000 (5:5) | E2000 |
| Comp. Ex. | IB2500/E2000 (5:5) | H3000/E2000 (5:5) |
| 9 | IB2500/E2000 (5:5) | IB2500 |

In Table 3, "IB2500", "E2000" and "H3000" mean as follows:

IB2500: Bisphenol A-type polycarbonate resin having branched chains. Trade name "IB2500" manufactured by Idemitsu Petrochemical Co., Ltd. Viscosity: $1 \times 10^4$ Pa·s, Melt tension: 14.21 cN, Average molecular weight: 29,000

E2000: Bisphenol A-type polycarbonate resin. Trade name "IUPILON E2000" manufactured by Mitsubishi Engineering Plastics. Viscosity: $7.5 \times 10^3$ Pa·s, Melt tension: 2.55 cN, Average molecular weight: 29,000

H3000: Bisphenol A-type polycarbonate resin. Trade name "IUPILON H3000" manufactured by Mitsubishi Engineering Plastics. Viscosity: $1 \times 10^4$ Pa·s, Melt tension: 0.49 cN, Average molecular weight: 18,000 when a mixed carbonate resin is used, the weight ratio is given in Table 3.

What is claimed is:

1. A composite sheet laminate showing a shrinkage of at least 6% in both longitudinal and lateral dimensions when heated at 180° C. for 60 seconds and comprising a foamed polycarbonate resin first layer and a non-foamed polycarbonate resin-containing second layer provided on at least one surface of said first layer and having a melt tension of at least 6.37 cN at 250° C., wherein said first and second layers are laminated by coextrusion or by extruding said second layer onto said first layer.

2. A composite sheet as claimed in claim 1, wherein said second layer has a melt tension of at least 7.84 cN at 250° C.

3. A composite sheet as claimed in claim 1, wherein the content of said polycarbonate resin in said second layer is at least 50% by weight and wherein said polycarbonate resin has a viscosity average molecular weight of 20,000–70,000.

4. A composite sheet as claimed in claim 1, wherein said polycarbonate resin in said second layer has a melt tension of at least 6.37 cN at 250° C.

5. A composite sheet as claimed in claim 1, wherein said first and second layers have thicknesses of 0.5–15 mm and 10–1500 μm, respectively.

6. A composite sheet as claimed in claim 1, wherein said polycarbonate resin has a viscosity average molecular weight of 23,000–50,000.

7. A composite sheet as claimed in claim 1, wherein said polycarbonate resin has a viscosity average molecular weight of 28,000–40,000.

8. A composite sheet as claimed in claim 1 wherein said composite sheet shows a shrinkage of at least 8% in both the longitudinal and lateral dimensions when heated at 180° C. for 60 seconds.

9. A composite sheet as claimed in claim 1 wherein said composite sheet shows a shrinkage of at least 8% in one of lateral and longitudinal dimensions and at least 10% in the other of said dimensions when heated at 180° C. for 60 seconds.

* * * * *